UNITED STATES PATENT OFFICE.

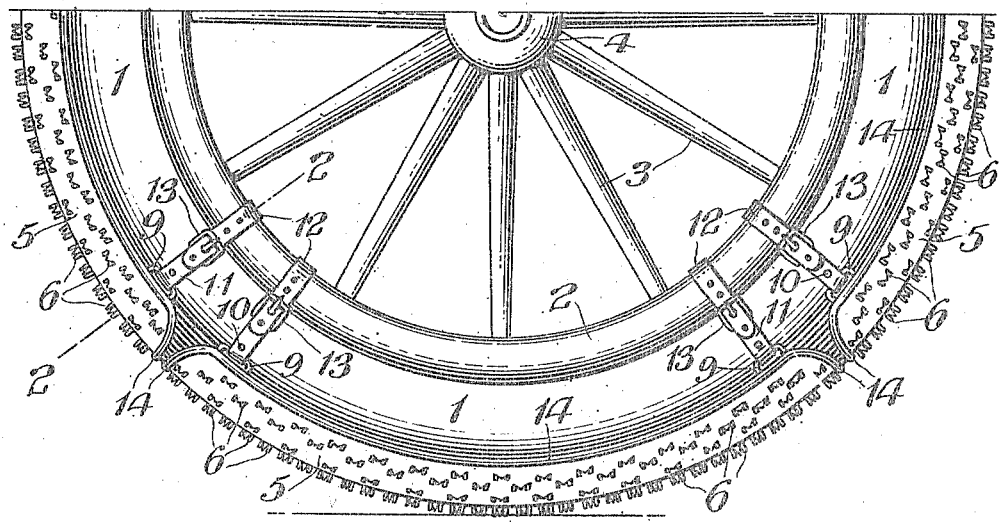

ABRAHAM FREIRICH, OF DEMAREST, NEW JERSEY.

NON-SKIDDING ATTACHMENT FOR WHEEL-TIRES.

1,275,897.  
Specification of Letters Patent.  
Patented Aug. 13, 1918.

Application filed October 12, 1916. Serial No. 125,135.

*To all whom it may concern:*

Be it known that I, ABRAHAM FREIRICH, a citizen of the United States, residing at Demarest, in the county of Bergen, State of New Jersey, have invented a new and useful Non-Skidding Attachment for Wheel-Tires, of which the following is a specification.

My invention consists of a non-skidding attachment for a wheel formed of means adapted to be imposed on the circumference of the tire thereof, and secured thereto, and having a tread which may be termed roughshod, so as to engage with and grip a road bed, especially when the latter is icy, greasy, wet, or in any other condition that would cause or allow the wheel to skid or slip, said means also protecting a tire from injury and not interfering with the resiliency of the tire when composed of rubber and appliable, also to a felly of a wheel of a wagon, carriage, or other vehicle.

Details of construction are also provided as will be hereinafter described.

The invention is satisfactorily illustrated in the accompanying drawing, but the important instrumentalities thereof may be varied, and so it is to be understood that the invention is not limited to the specific details shown and described.

Figure 1 represents a side elevation of a portion of a non-skidding attachment for a wheel embodying my invention and a corresponding portion of the wheel to which the attachment is applied.

Fig. 2 represents a transverse section thereof on an enlarged scale, on line 2—2 Fig. 1.

Fig. 3 represents a face view of a portion of the attachment on an enlarged scale.

Fig. 4 represents a longitudinal section of a portion thereof on line 4—4 Fig. 3.

Fig. 5 is a detail transverse section illustrating a modification in which the plate shown has a transversely-extending channel for the reception of an attaching strap.

Fig. 6 is a detail broken perspective view showing another modification in which the attaching strap is riveted directly to the plate.

Fig. 7 is a detail transverse section illustrative of the application of a plate constructed in accordance with my invention to the felly of a wheel.

Similar numerals of reference indicate corresponding parts in the figures.

Referring to the drawings.

1 designates a rubber or resilient tire of an automobile wheel. 2 designates the rim or felly portion thereof, 3 the spokes, and 4 the hub thereof, which features of themselves as members of an automobile or other vehicle are well known.

5 designates segmental plates which are disposed upon the outer periphery or tread portion of the tire around the same and having outwardly projecting spurs or teeth 6 forming an anti-skidding attachment for the wheel, it being noticed that in the rotation of the wheel said spurs are adapted to engage the road bed and grip with the same and so prevent the skidding of the wheel.

The plates and their spurs may be formed of cast or wrought metal or other material, or of sheet metal, the spurs being punched out of the same.

The plates while conforming to the circumferential curve of the tire conform also to the transverse curvature of the latter, both as shown in Fig. 2, or the plates 7 may be made straight in cross section as shown, so as to be fitted directly upon and secured to the felly 8 of a wagon or other vehicle wheel, as shown in Fig. 7.

In order to connect the plates 5 with the tire 1, said plates are formed on the sides thereof with the loops 9, as in Figs. 1 and 2, and to said loops or eyes are riveted as at 10 the straps 11 and 12, the straps 12 being passed around one side of the tire, and under and across the rim 2, and then engaged with the straps 11, by the buckles 13, and thus the plates may be held firmly in position on the tire, and conveniently removed therefrom when so desired.

The number of plates and of the fastening devices may be increased as desired, it being noticed also that the ends of the plates sufficiently approach each other to break joints and form an articulation of plates around the tire, while preserving the continuity of the attachment and preserving the resiliency of the wheel.

The ends and side edges of the plates are formed with beads 14 as rounded borders therefor, so as to guard the tire from being cut by the edges of the plates. It is evident that other means than those hereinbefore stated of securing the fastening in position may be employed, as the straps 11 and 12 may be riveted directly to the sides of the plates as at 10 Fig. 6, in which case, the loops 9 may be dispensed with.

In Fig. 5, the plates have therein the transversely-extending channels 15 to receive the strap 16, which is passed around the tire 1 and rim 2, and its ends buckled with the result as in the previous instances.

Attention is directed to the fact that the plates 5 also act as armor for the tire, covering or inclosing sufficiently the tread portion of the latter, so as to guard the same from being struck and injured by obstructions on the roadbed, and as spurs are made preferably hollow they take better hold of the roadbed and allow air to enter, thus keeping the spurs and consequently the attachment in cool condition.

The plates lie flat and smooth on the tire 1 and so protecting the latter from objects on the road bed that strike and injure the tire, and also as they cover the tire to that extent they prevent blow-outs, thus adding durability and life to the tire. Air may enter the spurs and circulate around the same so as to keep the plates and the spurs and the tire from becoming warm and heated. The spurs may be cast or struck up solid with the plates with rough or pointed surfaces or edges as desired. The plates being separate produce an articulation of the attachment allowing certain play at the terminals of the plates without affecting the resilient nature of the tire owing to the articulation.

Having thus described my invention what I claim as new and desire to secure by Letters Patent, is:—

A non-skidding attachment for tires, comprising a metallic plate applicable to the tread portion of a tire and having openings scattered throughout its area and also having outwardly-extending flanges grouped about and adjacent to each opening and pointed; the openings and their complementary flanges being arranged in series lengthwise and crosswise of the plate and being also arranged in staggered relation whereby they are disposed close together.

ABRAHAM FREIRICH.

Witnesses:
 J. C. MAGNESS,
 FRED C. ROWLAND.